United States Patent Office 3,483,085
Patented Dec. 9, 1969

3,483,085
REMOVAL OF TRANSGLUCOSIDASE FROM
AMYLOGLUCOSIDASE
Moshe Sternberg, South Bend, Ind., assignor to Miles
Laboratories, Inc., Elkhart, Ind., a corporation of
Indiana
No Drawing. Filed May 8, 1967, Ser. No. 636,598
Int. Cl. C07g 7/02
U.S. Cl. 195—66
7 Claims

ABSTRACT OF THE DISCLOSURE

Transglucosidase impurity can be removed from amyloglucosidase solutions by mixing such solutions with a heteropoly acid to form a precipitate with transglucosidase and then separating the precipitate from the so-purified amyloglucosidase. Useful heteropoly acids are phosphomolybdic acid, phosphotungstic acid, phosphovanadic acid, silicomolybdic acid, silicotungstic acid, silicovanadic acid, boromolybdic acid, borotungstic acid, borovanadic acid and mixtures and combinations thereof.

BACKGROUND AND PRIOR ART

Amyloglucosidase, an enzyme which has also been referred to as glucamylase, glucogenic enzyme, starch glucogenase, gamma-amylase and $\alpha$-1,4, glucan glucohydrase, is a well-known material which catalyzes the hydrolysis of starch to dextrose. This enzyme appears to aid in the formation of dextrose directly from starch without the production of intermediate products, such as higher sugars and soluble dextrins. This enzyme is also capable of catalyzing the hydrolysis of intermediate starch hydrolysis products to dextrose.

Amyloglucosidase is known to be prepared by fermentation processes employing certain strains of fungi belonging to the *Aspergillus niger* group and certain strains of rhizopus species. Illustrative fungi are those of the species *Aspergillus niger*, *Aspergillus oryzae*, *Rhizopus delemar*, *Aspergillus phoenicis* and the like.

The fungal strains producing amyloglucosidase are also known to produce other enzymes, such as transglucosidase. Transglucosidase promotes the formation, particularly from maltose and glucose, of unfermentable carbohydrates. When transglucosidase is present as a contaminant in amyloglucosidase employed to hydrolyze starch to dextrose, lower yields of dextrose are obtained than if the transglucosidase were absent. The presence of transglucosidase in the usual amyloglucosidase preparations has been generally recognized and considerable work has been carried out to reduce and substantially eliminate the transglucosidase impurity in amyloglucosidase.

Prior art methods for removing transglucosidase from amyloglucosidase have employed clay, synthetic magnesium silicate, fuller's earth, and ion-exchange materials to selectively adsorb the transglucosidase. Selective precipitation of the transglucosidase impurity has also been employed. None of the prior art purification methods were commercially satisfactory for removal of substantial amounts of the transglucosidase impurity without also removing appreciable amounts of the desired amyloglucosidase product.

STATEMENT OF THE INVENTION

In accordance with the present invention, a process is provided for removing transglucosidase impurities from amyloglucosidase which comprises mixing an amyloglucosidase solution containing transglucosidase impuity with a heteropoly acid selected from the class consisting of phosphomolybdic acid, phosphotungstic acid, phosphovanadic acid, silicomolybdic acid, silicotungstic acid, silicovanadic acid, bromolybdic acid, borotungstic acid, borovanadic acid and mixtures and combinations thereof to form a precipitate between the transglucosidase and the heteropoly acid and then separating the precipitate from the so-purified amyloglucosidase. This process has the advantages of removing substantial amounts of transglucosidase without also removing appreciable amounts of amyloglucosidase.

DESCRIPTION OF THE INVENTION

The process of the present invention is useful for purifying amyloglucosidase in various forms. It can be in the form of aqueous whole cultures and fermentation beers known in the art. It can also be in the form of dried material which is then dissolved in aqueous media for use in the present process. The concentration of amyloglucosidase in the aqueous solution is not critical. As is known in the art, dilute solutions will require large quantities of liquid material to be processed in order to purify a given quantity of amyloglucosidase. The more concentrated solutions will enable a given quantity of amyloglucosidase to be purified with less effort and in a shorter period of time.

The heteropoly acids useful in this invention are phosphomolybdic acid, phosphotungstic acid, phosphovanadic acid, silicomolybdic acid, silicotungstic acid, silicovanadic acid, boromolybdic acid, borotungstic acid, borovanadic acid, mixtures of two or more of these acids, and combinations of two or more of the acids, such as, silicotungsticvanadic acid, phosphomolybdictungstic acid and boromolybdic-tungsticvanadic acid. These heteropoly acids are well-known materials and are prepared by well-known methods. These heteropoly acids are all soluble in water.

In the practice of this invention an aqueous solution of amyloglucosidase is mixed with the heteropoly acid or a solution of the heteropoly acid. The heteropoly acid is employed in an amount such that the resulting mixture contains from about 0.075 to about 0.45 percent (weight/volume basis) heteropoly acid. It is preferred to use the heteropoly acid in an amount such that the resulting mixture contains from about 0.15 to about 0.4 percent (weight/volume basis) heteropoly acid. The pH of the amyloglucosidase solution should be in the range of from about 2.5 to about 3.5 when it is mixed with the heteropoly acid. When the pH is below about 2.5, the heteropoly acid treatment tends to precipitate a substantial amount of amyloglucosidase along with the transglucosidase impurity. When the pH is above about 3.5, there is no separation of transglucosidase from amyloglucosidase. The mixing temperature is from about 0° C. to about 50° C., preferably about 37° C. When the temperature is below about 0° C., the amyloglucosidase solutions will tend to freeze. When the temperature is above about 50° C. substantially all amyloglucosidase activity is lost. The mixing time is from about 15 minutes to about 90 minutes, preferably from about 30 minutes to about 60 minutes.

The process of the present invention removes transglucosidase from amyloglucosidase with minimum loss of amyloglucosidase. Well known methods are employed for determining amyloglucosidase content (defined in terms of activity units per ml.) of starting material and purified material to measure amyloglucosidase recovery. Transglucosidase removal is determined by incubating a maltose solution with the amyloglucosidase purified by the present process and measuring the optical activity (specific rotation) of the resulting product. This specific rotation value is then compared with the specific rotation value obtained with the unpurified material. The higher the specific rotation value of any given sample, the higher will be the transglucosidase content.

The methods for determining amylglucosidase activity and transglucosidase activity are described below.

*Amyloglucosidase activity.*—An aqueous solution is prepared containing 4.0 g. of soluble starch (moisture-free basis) and 5.6 ml. of 1.1 M acetate buffer, pH 4.2 per 100 ml. Exactly 50 ml. of the buffered starch solution is pipetted into a 100 ml. volumetric flask and equilibrated in a water bath at 60° C. for 15 minutes. Then 1.0 ml. of enzyme solution, properly diluted so that 20 percent to 30 percent hydrolysis will occur during the incubation period, is added and mixed. After exactly 60 minutes of incubation in the water bath at 60° C., the solution is adjusted to a pink phenolphthalein end point by adding 2 N sodium hydroxide. The solution is then cooled to room temperature and diluted to volume with distilled water. Reducing sugar, calculated as dextrose, is determined on the diluted sample and on a blank solution treated in the same way but with no added enzyme. Dextrose content is conveniently determined by the well-known Schoorl method described in National Bureau of Standards Circular C–440, "Polarimetry, Saccharimetry and the Sugars," pp. 192–193 (1942). Amyloglucosidase activity is calculated from the formula:

$$A = \frac{S-B}{E}$$

where:

A = amyloglucosidase activity, units per ml. of enzyme preparation.
S = reducing sugars in enzyme treated sample, grams per 100 ml. diluted sample.
B = reducing sugars in blank, grams per 100 ml. diluted sample.
E = amount of enzyme used, ml. per 100 ml. diluted sample.

*Transglucosidase activity.*—A solution of maltose is prepared by dissolving 100.0 g. C.P. maltose in distilled water and diluting to 500 ml. A 50.0 ml. portion of this 20 percent (percent w./v.) maltose solution is then placed in a 100 ml. flask and diluted to 100 ml. with distilled water. To the flask containing a 10 percent (percent w./v.) maltose solution is added 5 ml. of 1.0 M acetate buffer, pH 4.0. After mixing, an amount of enzyme preparation containing 5.0 units of amyloglucosidase activity is added. The flask is placed in a 60° C. water bath and heated for 72 hours. At the end of this incubation period, the optical rotation of the sugar solution is measured by well-known techniques. The higher the specific rotation measured at 20° C., $[\alpha]_D^{20}$, the higher will be the transglucosidase activity or content of the enzyme preparation being tested.

The present invention will be further described in the following illustrative examples.

Example 1

An aqueous amyloglucosidase solution was obtained by fermenting an aqueous corn mash with a fungal strain of the *Aspergillus niger* group and then filtering off the mycelium. The filtrate contained 8.0 amyloglucosidase activity units per ml. The pH of the filtrate was adjusted to 3.2 by addition of hydrochloric acid. Phosphotungstic acid was then added in sufficient quantity to obtain a concentration of 0.2 percent (weight/volume basis). This mixture was then agitated for 30 minutes at 37° C. during which time a precipitate formed. The resultant mixture was filtered. This filtrate contained 7.85 amyloglucosidase activity units per ml. which represented a retention of 98.2 percent of the amyloglucosidase activity. Transglucosidase activity was measured on the original amyloglucosidase solution prior to mixing with the heteropoly acid and on the final filtrate after treatment with the heteropoly acid. Specific rotation of the starting material was $[\alpha]_D^{20}$ = 55.83°. Specific rotation of the purified amylglucosidase was 53.58°. This significant reduction in optical rotation of the purified product indicates substantial removal of transglucosidase impurity.

Example 2

The procedure of Example 1 was followed with two additional portions of amyloglucosidase solutions in which the mixing times with the heteropoly acid were 15 minutes and 90 minutes. The results are shown below.

| Mixing time, minutes | Amyloglucosidase retention, percent | Specific rotation, degrees |
|---|---|---|
| 15 | 95.0 | 54.20 |
| 90 | 96.2 | 53.27 |

Example 3

The procedure of Example 1 was followed wherein the concentration of the heteropoly acid was 0.1 percent (weight/volume basis). The purified amyloglucosidase solution had a specific rotation of 53.76° and amyloglucosidase-retention of 98.2 percent.

Example 4

The procedure of Example 1 was followed wherein the pH was 3.5, the concentration of heteropoly acid was 0.26 percent (weight/volume basis) and the mixing time was 60 minutes. The specific rotation of the amyloglucosidase solution before treatment was 56.32° and the specific rotation of the purified amyloglucosidase solution was 53.75°.

Example 5

The procedure of Example 1 was followed wherein the heteropoly acid was silicotungstic acid at a concentration of 0.18 percent (weight/volume basis). The specific rotation of the amyloglucosidase solution before treatment was 55.00° and the specific rotation of the purified amyloglucosidase solution was 53.50°.

Example 6

The procedure of Example 1 was followed wherein the pH was 3.05 and the heteropoly acid was phosphomolybdic acid at a concentration of 0.37 percent (weight/volume basis). The purification achieved was determined by measuring the glucose and isomaltose contents of the products obtained by treating a maltose solution with the unpurified amyloglucosidase and the purified amyloglucosidase in accordance with the above-described transglucosidase assay. It is well-known, for example, that isomaltose is an undesirable product caused by the presence of transglucosidase impurity during carbohydrate conversion by amyloglucosidase. The higher the production of isomaltose, the lower the yield of glucose. Isomaltose also interferes with the subsequent crystallization of glucose leaving substantial quantities of the glucose in the mother liquor. The following results were obtained.

| Amyloglucosidase Solution | Glucose, percent | Isomaltose, percent |
|---|---|---|
| Untreated | 95.95 | 1.73 |
| Purified | 98.18 | 0.24 |

The substantial elimination of isomaltose and the increase in glucose clearly shows substantial removal of transglucosidase impurity. There was substantially no loss of amyloglucosidase activity.

Example 7

The procedure of Example 6 was followed wherein the pH was 3.0–3.1, the heteropoly acid was silicomolybdic acid at a concentration of 0.3 percent (weight/volume basis), and the mixing time was 45 minutes. The following results were obtained.

| Amyloglucosidase Solution | Glucose, percent | Isomaltose, percent |
|---|---|---|
| Untreated | 95.94 | 1.73 |
| Purified | 97.84 | 0.42 |

There was substantially no loss of amyloglucosidase activity.

While the above examples were limited to use of phosphotungstic acid, silicotungstic acid, phosphomolybdic acid and silicomolybdic acid, it is understood that phosphovanadic acid, silicovanadic acid, borotungstic acid, boromolybdic acid, borovanadic acid, mixtures of these acids and combinations of these acids can also be conveniently employed to remove transglucosidase impurities from amyloglucosidase.

In summary, transglucosidase impurity can be conveniently removed from amyloglucosidase preparations without appreciable loss of amyloglucosidase activity by treating the amyloglucosidase with a heteropoly acid to form a separable precipitate with the transglucosidase.

What is claimed is:

1. A process for removing transglucosidase impurities from amyloglucosidase which comprises mixing an amyloglucosidase solution containing transglucosidase impurity and having a pH of from about 2.5 to about 3.5 with a heteropoly acid selected from the class consisting of phosphomolybdic acid, phosphotungstic acid, phosphovanadic acid, silicomolybdic acid, silicotungstic acid, siliconvanadic acid, boromolybdic acid, borotungstic acid, borovanadic acid and mixtures and combinations thereof to form a precipitate between the transglucosidase and the heteropoly acid and then separating the precipitate from the so purified amylogucosidase.

2. A process according to claim 1 wherein the concentration of the heteropoly acid in the amyloglucosidase solution is from about 0.075 to about 0.45 percent (weight/volume basis), the mixing temperature is from about 0° C. to about 50° C. and the mixing time is from about 15 to about 90 minutes.

3. A process according to claim 1 wherein the concentration of the heteropoly acid in the amyloglucosidase solution is from about 0.15 to about 0.4 percent (weight/volume basis), the mixing temperature is about 37° C., and the mixing time is from about 30 to about 60 minutes.

4. A process according to claim 1 wherein the heteropoly acid is phosphotungstic acid.

5. A process according to claim 1 wherein the heteropoly acid is phosphomolybdic acid.

6. A process according to claim 1 wherein the heteropoly acid is silicotungstic acid.

7. A process according to claim 1 wherein the heteropoly acid is silicomolybdic acid.

References Cited

Methods in Enzymology, vol. I, page 85 (1955).

LIONEL M. SHAPIRO, Primary Examiner